United States Patent
Mori et al.

(10) Patent No.: US 10,254,172 B2
(45) Date of Patent: Apr. 9, 2019

(54) TEMPERATURE SENSOR WITH IMPROVED SHEATH

(71) Applicant: NGK Spark Plug Co., LTD., Nagoya (JP)

(72) Inventors: Akio Mori, Konan (JP); Tatsuya Suzuki, Bankok (TH); Toshinori Nishi, Niwa-gun (JP); Seiji Oya, Niwa-gun (JP); Toshiya Oya, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 277 days.

(21) Appl. No.: 15/022,142

(22) PCT Filed: Oct. 23, 2014

(86) PCT No.: PCT/JP2014/078206
§ 371 (c)(1),
(2) Date: Mar. 15, 2016

(87) PCT Pub. No.: WO2015/060380
PCT Pub. Date: Apr. 30, 2015

(65) Prior Publication Data
US 2016/0231180 A1    Aug. 11, 2016

(30) Foreign Application Priority Data

Oct. 24, 2013 (JP) .................................. 2013-220902
Feb. 10, 2014 (JP) ................................. 2014-023578

(51) Int. Cl.
*G01K 7/00* (2006.01)
*G01K 1/08* (2006.01)
(Continued)

(52) U.S. Cl.
CPC ................ *G01K 1/08* (2013.01); *G01K 1/14* (2013.01); *G01K 7/22* (2013.01)

(58) Field of Classification Search
USPC ........................................................ 374/163
See application file for complete search history.

(56) References Cited

U.S. PATENT DOCUMENTS

| 6,466,123 | B1 | 10/2002 | Kuzuoka et al. |
| 2007/0252672 | A1* | 11/2007 | Nyffenegger ............ G01K 1/08 338/28 |

(Continued)

FOREIGN PATENT DOCUMENTS

| JP | 57-004712 U | 1/1982 |
| JP | 11-218449 A | 8/1999 |

(Continued)

OTHER PUBLICATIONS

International Search Report dated Jan. 27, 2015 for the corresponding PCT Application No. PCT/JP2014/078206.

*Primary Examiner* — Lisa Caputo
*Assistant Examiner* — Nasir U Ahmed
(74) *Attorney, Agent, or Firm* — Leason Ellis LLP

(57) ABSTRACT

A temperature sensor includes a temperature sensitive element, a sheath portion, a surrounding portion, and a holding member. This temperature sensor has a void formed forward of a temperature sensitive body. When the void is projected in an axial direction of the surrounding portion from a forward end side of the surrounding portion, the void contains at least a forward end surface of the temperature sensitive body.

12 Claims, 6 Drawing Sheets

(51) Int. Cl.
   *G01K 7/22* (2006.01)
   *G01K 1/14* (2006.01)

(56) References Cited

U.S. PATENT DOCUMENTS

| | | |
|---|---|---|
| 2009/0168842 A1 | 7/2009 | Yokoi et al. |
| 2009/0323765 A1* | 12/2009 | Yokoi .................... G01K 1/08 374/185 |
| 2011/0228812 A1 | 9/2011 | Suzuki et al. |

FOREIGN PATENT DOCUMENTS

| | | |
|---|---|---|
| JP | 2009-175129 A | 8/2009 |
| JP | 2010-127747 A | 6/2010 |
| JP | 4760584 B | 8/2011 |
| JP | 4768432 B | 9/2011 |

\* cited by examiner

TEMPERATURE SENSOR WITH IMPROVED SHEATH

CROSS REFERENCE TO RELATED APPLICATIONS

This application is a U.S. National Phase Application under 35 U.S.C. § 371 of International Patent Application No. PCT/JP2014/078206, filed Oct. 23, 2014, and claims the benefit of Japanese Patent Application No. 2013-220902 filed Oct. 24, 2013, and Japanese Patent Application No. 2014-023578 filed Feb. 10, 2014, all of which are incorporated by reference in their entireties herein. The International Application was published in Japanese on Apr. 30, 2015 as International Publication No. WO/2015/060380 under PCT Article 21(2).

FIELD OF THE INVENTION

The present invention relates to a temperature sensor including a temperature sensitive element such as a thermistor element or a Pt resistor element.

BACKGROUND OF THE INVENTION

One generally known temperature sensor is composed mainly of a temperature sensitive element such as a thermistor element; a sheath portion that internally holds metal conductors in an insulated condition, the metal conductors being electrically connected by welding to element electrode wires extending from electrodes of the temperature sensitive element; a metal tube that accommodates the temperature sensitive element, the metal conductors, and the sheath portion; and cement charged into the metal tube to hold the temperature sensitive element and the metal conductors (see, for example, Japanese Patent Application Laid-Open (kokai) No. 2009-175129, Japanese Patent No. 4760584 and Japanese Patent No. 4768432).

Such a sensor is used as a vehicle-mounted temperature sensor or used for exhaust gas measurement in a general-purpose stationary engine, etc. In other words, such a sensor is used as a sensor, such as a high-temperature sensor, which is used for measurement of high temperatures under the use conditions under which vibrations are applied to the periphery of a temperature sensing portion of the sensor.

Problems to be Solved by the Invention

In the temperature sensors described in Japanese Patent Application Laid-Open (kokai) No. 2009-175129, Japanese Patent No. 4760584 and Japanese Patent No. 4768432, cement is charged to reach the forward end of the metal tube in order to hold the temperature sensitive element inside the metal tube. One example of the method of charging the cement is to apply, for example, centrifugal force to the cement charged into the metal tube before the cement is solidified to thereby fill the metal tube with the cement up to the forward end thereof.

When any of the temperature sensors described above is subjected to high-temperature conditions and low-temperature conditions repeatedly as in a heating and cooling cycle test, stress is applied to the element electrode wires of the temperature sensitive element and the metal conductors (mineral insulated cables: sheath). In this case, low-strength joint portions between the element electrode wires and the metal conductors may be disconnected.

Specifically, when the temperature sensor placed under high-temperature conditions is transferred to low-temperature conditions, the temperature of the periphery of the temperature sensitive element may sharply decrease from high temperature to low temperature. In this case, the temperature of the metal tube forming an outer wall decreases first, and this decrease in temperature causes the metal tube to shrink. Then the temperature of the sheath disposed inside the metal tube starts decreasing, and the sheath starts shrinking. In other words, the timing when the metal tube starts shrinking is different from the timing when the sheath disposed inside the metal tube starts shrinking.

Therefore, at the point in time when the metal tube starts shrinking, the sheath still remains thermally expanded. The shrinkage of the metal tube is transmitted to the sheath and the element electrode wires of the temperature sensitive element through the cement charged into the metal tube, and therefore stress is applied to the joint portions of the element electrode wires. This may cause the joint portions to be disconnected.

Desirably, one aspect of the present invention provides a temperature sensor configured to suppress disconnection of the joint portions of the temperature sensitive element due to thermal stress.

SUMMARY OF THE INVENTION

Means for Solving the Problems

A temperature sensor in one aspect of the present invention comprises a temperature sensitive element, a sheath portion, a surrounding portion, and a holding member.

The temperature sensitive element includes a temperature sensitive body and an element electrode wire. The sheath portion includes a sheath conductor connected to the element electrode wire. The surrounding portion having a tubular shape has a bottom portion at a forward end thereof and extends in an axial direction. The surrounding portion has an inner space that accommodates at least the temperature sensitive element and a joint portion between the element electrode wire and the sheath conductor. The holding member is disposed in the inner space and is in contact with at least part of a side circumferential portion of the temperature sensitive body, the side circumferential portion being located between a forward end of the temperature sensitive body and a rear end thereof.

A void is provided forward of the temperature sensitive body within the surrounding portion.

This temperature sensor is configured such that, when the void is projected in the axial direction from a forward end side of the surrounding portion, the void contains at least a forward end surface of the temperature sensitive body.

The void is formed as a space that contains no solid and no liquid and may be formed, for example, as a space containing gas (such as air) or as a vacuum space.

In this temperature sensor, the void present forward of the temperature sensitive body is formed so as to contain the forward end surface of the temperature sensitive body, so that the thermal stress applied to the temperature sensitive element, the sheath conductor, and the joint portion can be reduced. Specifically, when the temperature sensor placed in a high-temperature state is brought into a low-temperature state, the temperature of the surrounding portion exposed to the outside decreases first, and then the temperatures of the holding member, the temperature sensitive element, the element electrode wire, and the sheath conductor that are disposed in the inner space of the surrounding portion decrease.

When the surrounding portion thermally shrinks due to a temperature drop thereof, the holding member is pushed rearward by the bottom portion of the surrounding portion. In this case, when the void is present forward of the temperature sensitive body, the void absorbs the rearward pushing force acting on the holding member. Therefore, the temperature sensitive element is not pushed toward the rear end side, so that the thermal stress applied to the joint portion between the element electrode wire and the sheath conductor is reduced. This effect can be obtained when the void is formed so as to contain at least the forward end surface of the temperature sensitive body. The void may be formed so as to contain a forward facing surface of the temperature sensitive body when the void is projected in the axial direction from the forward end side of the surrounding portion. In this case, the above effect is obtained more effectively.

In the above-described temperature sensor, the holding member may be in contact with an inner wall surface of the bottom portion of the surrounding portion. In this case, the bottom portion, i.e., the forward end portion, of the surrounding portion is in direct contact with the holding member. Since a heat conduction path extending from the bottom portion of the surrounding portion through the holding member to the temperature sensitive body is formed, the response speed of the temperature sensor tends to be improved.

In the above-described temperature sensor, the void may be disposed so as to extend from the forward facing surface of the temperature sensitive body to the side circumferential portion, and a distance from the temperature sensitive element to a forward end boundary of the void may be larger than a distance from the temperature sensitive element to a side boundary of the void. In this case, the void can provide a space forward of the temperature sensitive element. Therefore, a space large enough to absorb the shrinkage of the holding member in the axial direction can be ensured, and stress due to the shrinkage can be easily absorbed.

In the above-described temperature sensor, the bottom portion may have a curved shape, and the void may have a continuous form extending from the bottom portion to a boundary between a circular cylindrical surface of the surrounding portion and the bottom portion. When one continuous void extending from the bottom portion of the surrounding portion to the boundary between the circular cylindrical surface and the bottom portion is formed as described above, the thermal stress acting on the joint portion between the element electrode wire and the sheath conductor is more likely to decrease.

Specifically, the void formed in a region extending from the bottom portion of the surrounding portion to the boundary between the circular cylindrical surface and the bottom portion absorbs the rearward pushing force acting on the holding member due to the thermal shrinkage of the surrounding portion, so that the thermal stress acting on the joint portion between the element electrode wire and the sheath conductor is reduced. Particularly, by forming one continuous void extending from the bottom portion of the surrounding portion to the boundary between the circular cylindrical surface and the bottom portion, the rearward pushing force acting on the holding member is more easily absorbed as compared to the case where discontinuous voids are formed, so that the thermal stress acting on the joint portion between the element electrode wire and the sheath conductor is more likely to decrease.

In the above-described temperature sensor, the bottom portion may have a curved shape, and the void may have a continuous form extending from the bottom portion to the forward end of the temperature sensitive body. When one continuous void extending from the bottom portion of the surrounding portion to the forward end of the temperature sensitive body is formed as described above, the thermal stress acting on the joint portion between the element electrode wire and the sheath conductor is likely to decrease further.

Specifically, the void formed in a region extending from the bottom portion of the surrounding portion to the forward end of the temperature sensitive body absorbs the rearward pushing force acing on the holding member due to the thermal shrinkage of the surrounding portion, and therefore the thermal stress acting on the joint portion between the element electrode wire and the sheath conductor is reduced. Particularly, by forming one continuous void extending from the bottom portion of the surrounding portion to the forward end of the temperature sensitive body, the rearward pushing force acting on the holding member is more easily absorbed as compared to the case where discontinuous voids are formed, so that the thermal stress acting on the joint portion between the element electrode wire and the sheath conductor is more likely to decrease.

Effects of the Invention

In the temperature sensor described above, the void present forward of the temperature sensitive body is formed so as to contain the forward end surface of the temperature sensitive body. Therefore, the thermal stress acting on the joint portion between the element electrode wire and the sheath conductor is more likely to decrease, and this provides the effect of suppressing the occurrence of a failure in the temperature sensitive element due to the thermal stress.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

Figure 1:
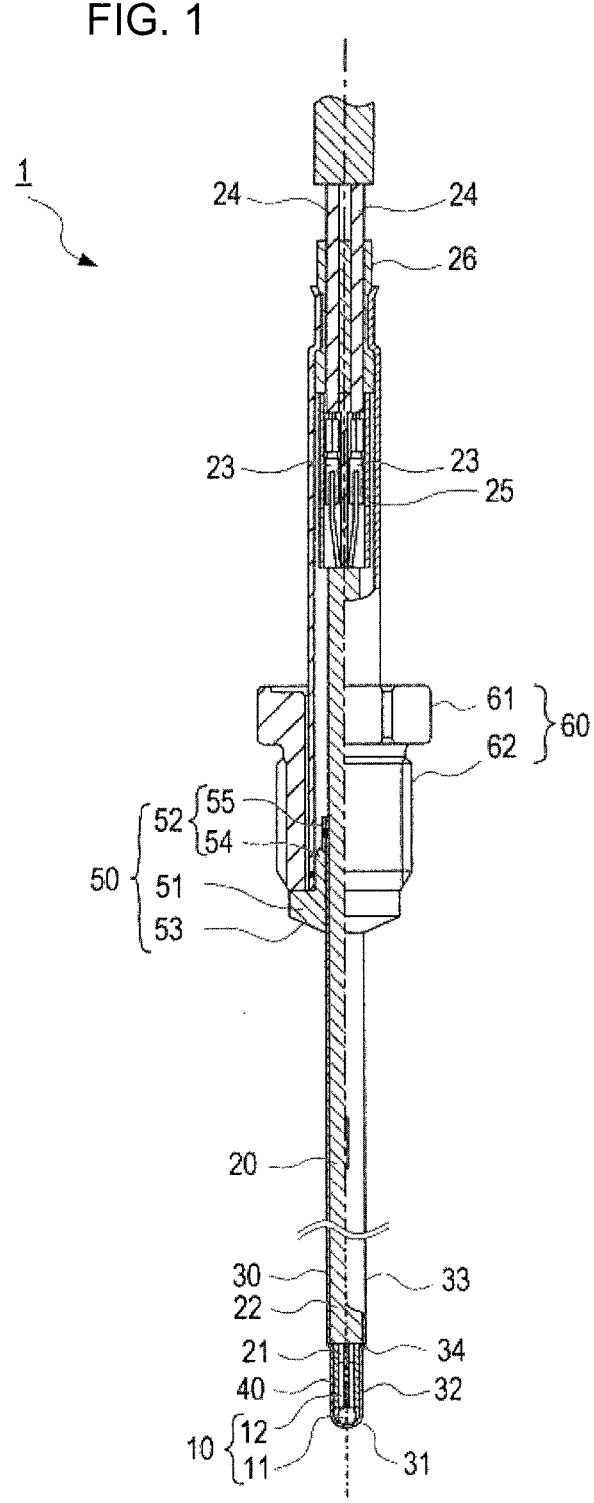
FIG. 1 is a partially cutaway cross-sectional view illustrating the structure of a temperature sensor which is a first embodiment of the present invention.

DESCRIPTION OF REFERENCE NUMERALS 1, 101: temperature sensor, 10: thermistor element (temperature sensitive element), 10P: temperature sensitive element, 11: temperature sensitive portion (temperature sensitive body), 12: electrode wire (element electrode wire), 15: welding point (joint portion), 15P: metallic resistor, 20: sheath portion, 21: metal conductor (sheath conductor), 30: metal tube (surrounding portion), 31: tube forward end (bottom portion), 40: cement (holding member), 70, 170: void

DETAILED DESCRIPTION OF THE INVENTION

First Embodiment

A temperature sensor according to a first embodiment of the present invention will be described with reference to FIGS. 1 to 4 and FIGS. 5A and 5B.

The temperature sensor 1 of the present embodiment is attached to, for example, a flow pipe such as an exhaust pipe of an internal combustion engine. Specifically, the temperature sensor 1 is disposed inside the flow pipe through which a measurement target gas (exhaust gas) flows and is used to detect the temperature of the measurement target gas. The temperature sensor 1 mainly includes a thermistor element (temperature sensitive element) 10, a sheath portion 20, a metal tube (surrounding portion) 30, a mounting portion 50, and a nut portion 60.

The thermistor element 10 is a temperature sensitive element disposed inside the flow pipe through which the measurement target gas flows and is disposed inside the metal tube 30. The thermistor element 10 includes a temperature sensitive portion (temperature sensitive body) 11, which is a thermistor sintered body whose electric characteristics (electric resistance) change with temperature, and a pair of electrode wires (element electrode wires) 12 for obtaining a change in the electric characteristics of the temperature sensitive portion 11.

The sheath portion 20 is configured such that a pair of metal conductors (sheath conductors) 21 are held inside a sleeve 22 in an insulated condition. The sheath portion 20 includes the sleeve 22 made of a metal, the pair of metal conductors 21 made of a conductive metal, and an insulating powder (not shown) that holds the metal conductors 21 while electrically insulating the sleeve 22 and the two metal conductors 21 from each other.

The metal tube 30 is a tubular member extending in an axial direction and having a closed forward end and is formed of a corrosion-resistant metal (for example, a stainless steel alloy such as SUS310S, which is also a heat-resistant metal). The metal tube 30 is formed by deep-drawing a steel plate into the shape of a tube extending in the axial direction with its forward end (bottom portion) 31 closed and its rear end open. The axial dimension of the metal tube 30 is set such that the rear end portion of the tube abuts against the inner surface of a second step portion 55 of the mounting portion 50. The tube forward end 31 of the metal tube 30 is formed into a curved surface.

The thermistor element 10 and cement (a holding member) 40 are disposed inside the metal tube 30. The metal tube 30 has a small-diameter portion 32 formed at its forward end, and a large-diameter portion 33 larger in diameter than the small-diameter portion 32 is formed rearward of the small-diameter portion 32. The small-diameter portion 32 and the large-diameter portion 33 are connected through a step portion 34.

The cement 40 fills the space around the thermistor element 10 and holds the thermistor element 10 to restrain it from vibrating. The cement 40 used may be a material having high thermal conductivity, high heat resistance, and high insulating performance. The cement used may be: cement formed mainly of an oxide such as $Al_2O_3$ or MgO, a nitride such as AlN, TiN, $Si_3N_4$, or BN, or a carbide such as SiC, TiC, or ZrC; or cement formed mainly of an oxide such as $Al_2O_3$ or MgO, a nitride such as AlN, TiN, $Si_3N_4$, or BN, or a carbide such as SiC, TiC, or ZrC and mixed with an inorganic binder such as $Al_2O_3$, $SiO_2$, or MgO.

The mounting portion 50 is a member for supporting the metal tube 30 and surrounds the outer circumferential surface of a rear end portion of the metal tube 30 to support the metal tube 30 with at least the forward end of the metal tube 30 exposed to the outside. The mounting portion 50 includes a protruding portion 51 protruding radially outward and a rear sheath portion 52 located rearward of the protruding portion 51 and extending in the axial direction.

The protruding portion 51 is an annular member including a mounting seat 53 provided at its forward end. The mounting seat 53 is a tapered member having a diameter decreasing toward the forward end side, and this tapered shape conforms to a tapered shape formed at a sensor mounting position of an exhaust pipe (not shown) and having a diameter increasing toward the rear end side. When the mounting portion 50 is disposed at the sensor mounting position of the exhaust pipe, the mounting seat 53 comes into contact with the tapered portion of the sensor mounting position, and leakage of the exhaust gas to the outside of the exhaust pipe is thereby suppressed.

The rear sheath portion 52 is a member formed into an annular shape and has a first step portion 54 located forward of the second step portion 55 smaller in outer diameter than the first step portion 54.

The nut portion 60 includes a hexagonal nut portion 61 and a threaded portion 62. The axial direction is the lengthwise direction of the temperature sensor 1 and is the vertical direction in FIG. 1. The forward end side of the temperature sensor 1 is the lower side in FIG. 1, and the rear end side is the upper side in FIG. 1.

The metal conductors 21 have forward end portions electrically connected at their welding points (joint portions) 15 to the electrode wires 12 of the thermistor element, and the rear end portions of the metal conductors 21 are connected to crimp terminals 23 by resistance welding. Specifically, the metal conductors 21 are connected at their rear ends to connection lead wires 24 of an external circuit such as an electronic control unit (ECU) of a vehicle through the crimp terminals 23.

The pair of metal conductors 21 are insulated from each other by an insulating tube 25, and the pair of crimp terminals 23 are insulated from each other also by the insulating tube 25. Each of the lead wires 24 is a conducting wire coated with an insulating coating material and is disposed so as to extend through a heat resistant rubber-made auxiliary ring 26.

The configuration of the forward end portion of the metal tube 30, which is the feature of the present embodiment, will be described with reference to FIGS. 2 to 4.

Figure 2:
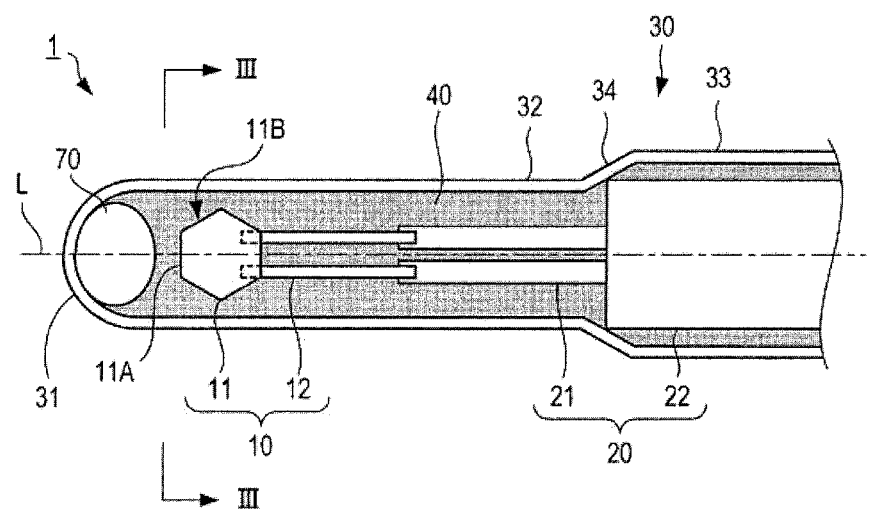
FIG. 2 is a cross-sectional view illustrating the internal structure of a forward end portion of a metal tube in FIG. 1.
Figure 3:
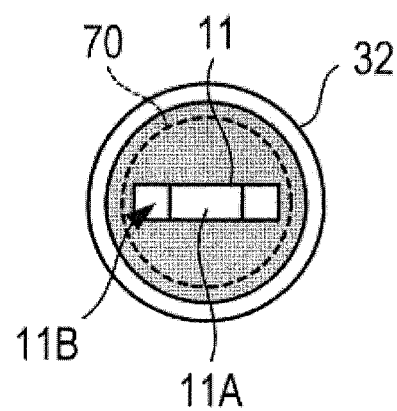
FIG. 3 is an illustration showing the positional relation among a small-diameter portion, a void, and a temperature sensitive portion in a projection on a III-III cross-section in FIG. 2 in a direction from the forward end of the metal tube toward the rear end thereof.

As shown in FIG. 2, in the cement 40 that fills the space inside the metal tube 30, a void 70 is formed on the forward end side (the left side in FIG. 2) of the temperature sensitive portion 11. The void 70 is formed as a space containing no solid and no liquid and may be formed as a space containing gas (such as air) or as a vacuum space. As shown in FIG. 3, the void 70 has a size large enough to contain forward facing surfaces 11B, including a forward end surface 11A, of the temperature sensitive portion 11.

The temperature sensitive portion 11 is formed into a low-height hexagonal cylindrical shape and disposed with a pair of opposite side surfaces being orthogonal to the axial direction L, and the forward end surface 11A of the temperature sensitive portion 11 is one of the pair of opposite side surfaces that is disposed at the forwardmost end. The forward facing surfaces 11B are all the side surfaces that appear on the forward end side and can be visually observed when the temperature sensitive portion 11 is viewed from the forward end side in the axial direction L. In the temperature sensitive portion 11 formed into a hexagonal cylindrical shape as in the present embodiment, the forward facing surfaces 11B are three side surfaces including the forward end surface 11A and a pair of side surfaces adjacent to the forward end surface 11A.

In the present embodiment, the temperature sensitive portion 11 formed into a low-height hexagonal cylindrical shape has six side surfaces, and four of them except for the pair of opposite side surfaces orthogonal to the axial direction L (i.e., the forward end surface 11A, which is the side surface on the forward end side, and the side surface on the rear end side) correspond to an example of the "side circumferential portion" in the present invention. The cement 40 is charged so as to be in contact with the above four side surfaces corresponding to the example of the "side circumferential portion" in the present invention. In the present embodiment, a description is given of the example in which the temperature sensitive portion 11 is formed into a low-height hexagonal cylindrical shape, but the shape of the temperature sensitive portion 11 is not limited to the hexagonal cylindrical shape. The temperature sensitive portion 11 may have any other polygonal cylindrical shape and may have a circular cylindrical shape.

Figure 4:
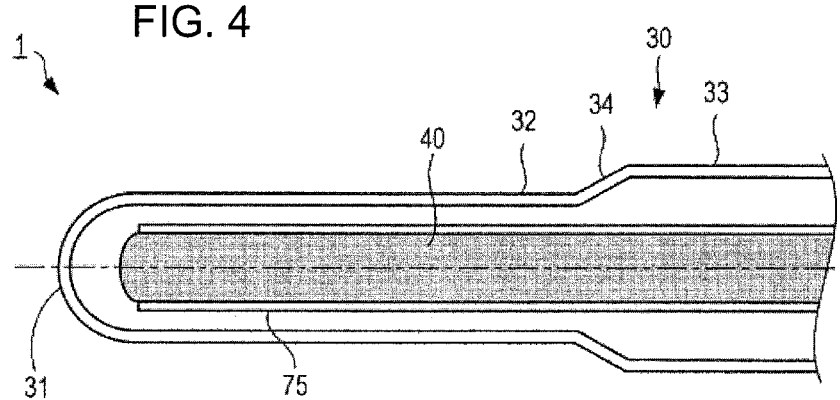
FIG. 4 is an illustration showing a method of charging cement into the metal tube.

The diameter of the void 70 is controlled by adjusting the position of the forward end of a charging needle 75 for charging the cement 40 into the metal tube 30, as shown in FIG. 4. For example, the diameter of the void 70 can be controlled by moving the relative position of the forward end of the charging needle 75 relative to the metal tube 30 according to the state of the cement 40 charged. Specifically, when the forward end of the charging needle 75 is moved toward the rear end side of the metal tube 30 at a relatively fast speed, the diameter of the void 70 becomes large. When the charging needle 75 is moved at a slow speed, the diameter of the void 70 becomes small.

Alternatively, the void 70 may be formed as follows. Before the cement 40 is charged, a sublimable material such as carbon, theobromine, or an organic binder is placed inside the metal tube 30. This sublimable material sublimates at relatively low temperature (e.g., 900° C. or lower) and disappears during the process of solidification of the cement 40 to thereby form a cavity in the cement 40. The thus-formed cavity serves as the void 70 described above.

Figure 5A:
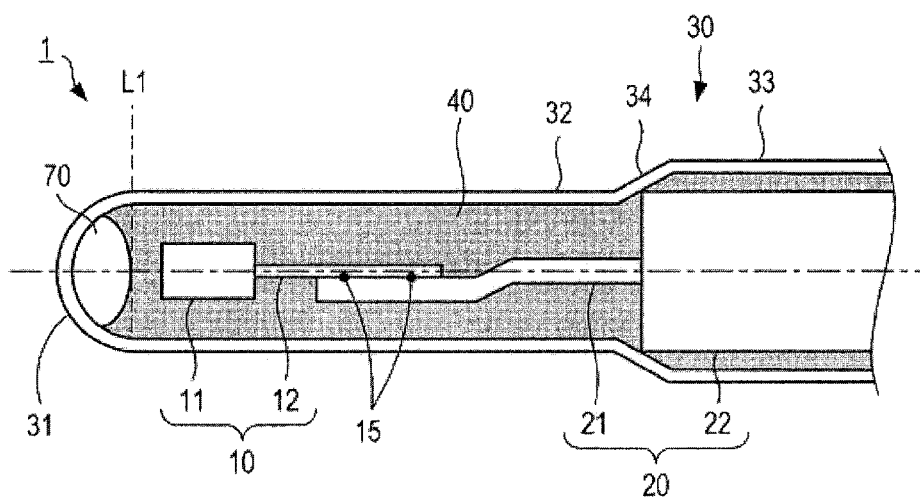
FIGS. 5A and 5B are cross-sectional views illustrating other examples of the internal structure in FIG. 2.

As shown in FIG. 5A, the void 70 present forward of the temperature sensitive portion 11 may be formed as one continuous void 70 extending from the tube forward end 31 of the metal tube 30 to a first reference plane L1 that is the boundary between the cylindrical surface and tube forward end 31 of the metal tube 30.

Figure 5B:
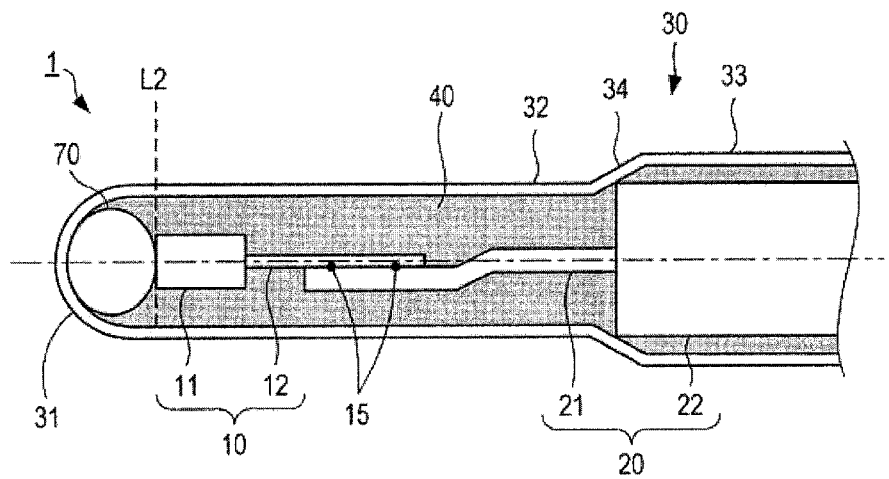

As shown in FIG. 5B, the void 70 present forward of the temperature sensitive portion 11 may be formed as one continuous void 70 extending from the tube forward end 31 of the metal tube 30 to a second reference plane L2 that is the forward end of the temperature sensitive portion 11 of the thermistor element 10.

In the temperature sensor 1 configured as described above, the void 70 present forward of the temperature sensitive portion 11 is formed so as to contain the forward end surface 11A of the temperature sensitive portion 11, so that the thermal stress applied to the welding points 15, i.e., joint portions, between the electrode wires 12 of the thermistor element 10 and the metal conductors 21 can be reduced. Specifically, when the temperature sensor 1 in a high-temperature state is brought into a low-temperature state, the temperature of the metal tube 30 exposed to the outside first decreases, and then the temperatures of the cement 40, the thermistor element 10, the electrode wires 12, and the metal conductors 21 that are disposed in the inner space of the metal tube 30 decrease.

When the metal tube 30 thermally shrinks due to a temperature drop thereof, the cement 40 is pushed rearward by the tube forward end 31 of the metal tube 30. In this case, when the void 70 is present forward of the temperature sensitive portion 11, the void 70 absorbs the rearward pushing force acting on the cement 40. Therefore, the temperature sensitive portion 11 is not pushed toward the rear end side, and the thermal stress applied to the welding points 15, which are the joint portions between the electrode wires 12 and the metal conductors 21, is reduced. The above effect can be obtained when the void 70 is formed so as to contain at least the forward end surface 11A of the temperature sensitive portion 11. When the void 70 is formed so as to contain the forward facing surfaces 11B of the temperature sensitive portion 11, the above effect is obtained more effectively. Therefore, the disconnection of the welding points 15 between the electrode wires 12 and the metal conductors 21 due to thermal stress can be suppressed, and the occurrence of a failure in the thermistor element 10 due to thermal stress can be suppressed.

When one continuous void 70 extending from the tube forward end 31 of the metal tube 30 to the first reference plane L1 that is the boundary between the circular cylindrical surface and the tube forward end 31 is formed as shown in FIG. 5A, the thermal stress applied to the welding points 15 between the electrode wires 12 and the metal conductors 21 is more likely to decrease. Specifically, the void 70 formed in a region extending from the tube forward end 31 of the metal tube 30 to the boundary between the circular cylindrical surface and the tube forward end 31 absorbs the rearward pushing force acting on the cement 40 due to the thermal shrinkage of the metal tube 30, so that the thermal stress acting on the welding points 15 between the electrode wires 12 and the metal conductors 21 is reduced. Particularly, by forming one continuous void 70 extending from the tube forward end 31 of the metal tube 30 to the first reference plane L1, the rearward pushing force acting on the cement 40 is more easily absorbed as compared to the case where discontinuous voids 70 are formed, so that the occurrence of a failure in the thermistor element 10 due to the thermal stress can be suppressed with more certainty.

When one continuous void 70 extending from the tube forward end 31 of the metal tube 30 to the second reference plane L2 that is the forward end of the temperature sensitive portion 11 is formed as shown in FIG. 5B, the thermal stress applied to the welding points 15 between the electrode wires 12 and the metal conductors 21 is likely to decrease further. Specifically, the void 70 formed in a region extending from the tube forward end 31 of the metal tube 30 to the second reference plane L2 absorbs the rearward pushing force acing on the cement 40 due to the thermal shrinkage of the metal tube 30, and therefore the thermal stress acting on the welding points 15 between the electrode wires 12 and the metal conductors 21 decreases. Particularly, by forming one continuous void 70 extending from the tube forward end 31 of the metal tube 30 to the second reference plane L2, the rearward pushing force acting on the cement 40 is more easily absorbed as compared to the case where discontinuous voids 70 are formed, so that the occurrence of a failure in the thermistor element 10 due to the thermal stress can be suppressed with more certainty.

A description will be given of the correspondence between terms used in the present embodiment and terms used in claims.

The temperature sensor 1 corresponds to an example of the temperature sensor in the claims, and the thermistor element 10 corresponds to an example of the temperature sensitive element in the claims. The temperature sensitive portion 11 corresponds to an example of the temperature sensitive body in the claims, and each of the electrode wires 12 corresponds to an example of the element electrode wire in the claims.

The sheath portion 20 corresponds to an example of the sheath portion in the claims, and each of the metal conductors 21 corresponds to an example of the sheath conductor in the claims. The metal tube 30 corresponds to an example of the surrounding portion in the claims, and the tube forward end 31 corresponds to an example of the bottom portion in the claims. Each of the welding points 15 corresponds to an example of the joint portion in the claims, and the cement 40 corresponds to an example of the holding member in the claims. The void 70 corresponds to an example of the void in the claims.

Modification of First Embodiment

Next, a temperature sensor according to a modification of the first embodiment of the present invention will be described with reference to FIG. 6 and FIGS. 7A and 7B. The basic configuration of the temperature sensor in the present embodiment is the same as that in the first embodiment, but the form of the temperature sensitive element is different from that in the first embodiment. Therefore, in the present embodiment, the configuration etc. of the temperature sensitive element will be described with reference to FIG. 6 and FIGS. 7A and 7B, and the description of the other components etc. will be omitted.

Figure 6:
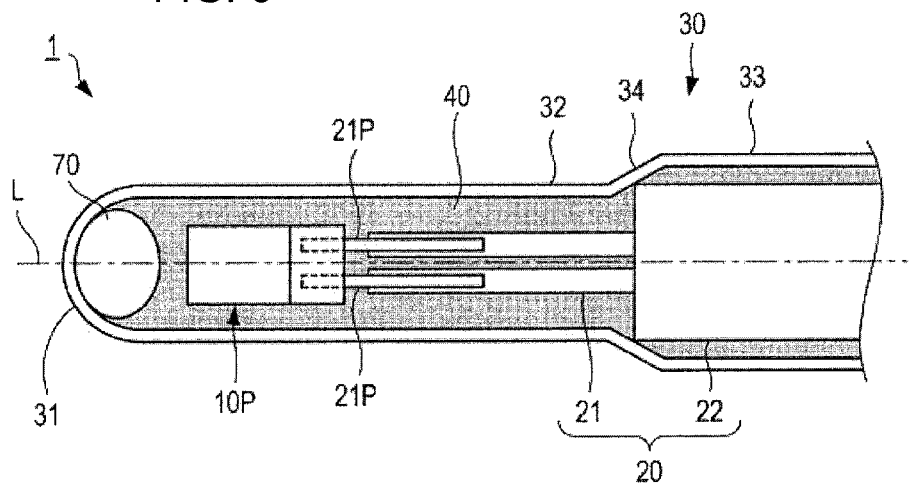
FIG. 6 is a cross-sectional view illustrating the internal structure of the forward end portion of the metal tube of a temperature sensor which is a modification of the first embodiment of the present invention.

As shown in FIG. 6, the temperature sensor 1 in the modification includes a temperature sensitive element 10P using a platinum resistor, a metal tube 30, etc.

Figure 7A:
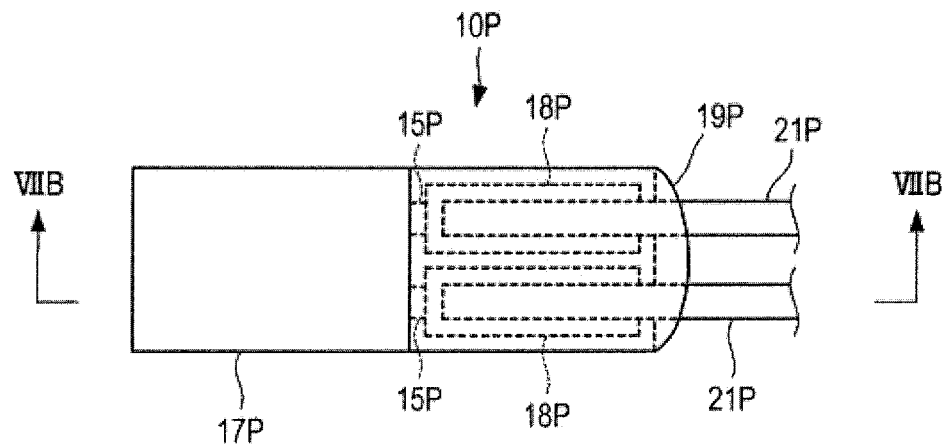
FIG. 7A is a schematic view illustrating the configuration of the temperature sensitive element in FIG. 6.
Figure 7B:
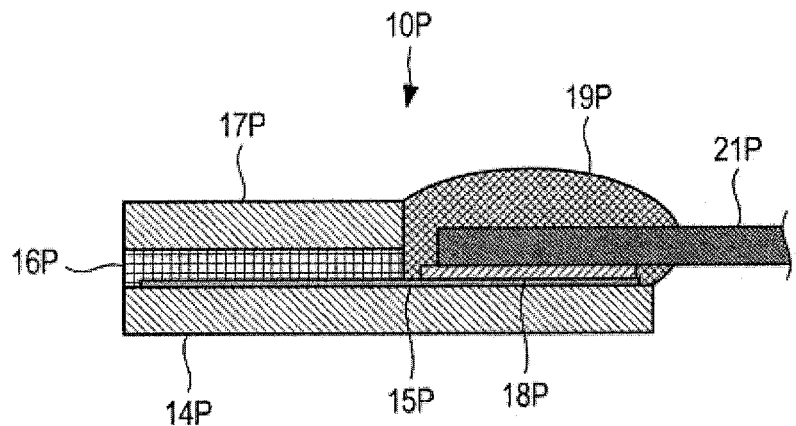
FIG. 7B is a VIIB-VIIB cross section in FIG. 7A.

As shown in FIGS. 7A and 7B, the temperature sensitive element 10P includes: a ceramic base 14P formed of alumina with a purity of 99.9%; a metallic resistor 15P formed as a film on the surface of the ceramic base 14P; and a ceramic covering layer 17P that is formed of alumina with a purity of 99.9% and covers the surface of the metallic resistor 15P that is opposite the surface in contact with the ceramic base 14P.

The metallic resistor 15P is composed mainly of platinum (Pt), and its electric resistance changes with temperature.

The ceramic covering layer 17P is a fired sheet obtained by firing a ceramic green sheet and is joined to a forward end portion (located on the left side in FIGS. 7A and 7B) of the fired ceramic base 14P through a junction layer 16 so as to cover a forward end portion of the metallic resistor 15P.

The junction layer 16P is also formed of alumina with a purity of 99.9%. Before joining, the junction layer 16P is a paste containing alumina powder. The paste is subjected to heat treatment after the fired ceramic base 14P and the ceramic covering layer 17P are laminated through the paste, whereby the junction layer 16P is eventually formed.

Rear end portions (located on the right side in FIGS. 7A and 7B) of the metallic resistor 15P are connected to lead wires 21P through thick-film pads 18P, and the connection portions are fixed through a lead wire-fixing material 19P, whereby the metallic resistor 15P is electrically connected to the lead wires 21P. The temperature sensitive element 10P configured as described above is electrically connected to, for example, an external device through the lead wires 21P.

In the present modification, a structural component obtained by removing the lead wires 21P from the temperature sensitive element 10P corresponds to an example of the "temperature sensitive body" in the present invention. Side surfaces of the temperature sensitive element 10P that are located between its forward end facing the tube forward end 31 and the rear end to which the lead wires 21P are connected correspond to an example of the "side circumferential portion" in the present invention. The cement 40 is charged so as to be in contact with the above-described side surfaces that correspond to an example of the "side circumferential portion" in the present invention.

The ceramic base 14P, ceramic covering layer 17P, and junction layer 16P of the temperature sensitive element 10P are formed of alumina with a purity of 99.9% or higher (99.9% in the present embodiment) and have high migration resistance.

Specifically, in the temperature sensor 1, deterioration of the metallic resistor 15P due to the influence of a measurement object can be restrained, and the occurrence of migration of components other than alumina contained in the ceramic base 14P, the ceramic covering layer 17P, and the junction layer 16P can be restrained. Therefore, variations in the value of the electric resistance of the temperature sensitive element 10P is unlikely to occur even in a high-temperature environment (e.g., 1,000[° C.]), so that a reduction in temperature detection accuracy can be restrained.

Since the cement 40 is disposed inside the metal tube 30 so as to be in contact with the temperature sensitive element 10P and the metal tube 30, the temperature sensitive element 10P is supported by the metal tube 30 through the cement 40. Therefore, the occurrence of a collision between the temperature sensitive element 10P and the metal tube 30 can be suppressed even in a use environment in which the temperature sensor 1 is likely to receive external force such as vibrations, so that breakage of the temperature sensitive element 10P due to the collision with the metal tube 30 can be suppressed. Since the temperature sensitive element 10P is supported by the metal tube 30 through the cement 40, a change in the position of the temperature sensitive element 10P relative to the metal conductors 21 can be restrained, and therefore disconnection of the connection portions between the temperature sensitive element 10P and the metal conductors 21 can be suppressed.

Since the temperature sensitive element 10P is disposed inside the metal tube 30, no water droplets, for example, adhere directly to the temperature sensitive element 10P, and this can suppress the occurrence of breakage such as cracking of the temperature sensitive element 10P due to uneven temperature distribution caused by adhesion of water droplets.

Second Embodiment

Next, a temperature sensor according to a second embodiment of the present invention will be described with reference to FIG. 8. The basic configuration of the temperature sensor in the present embodiment is the same as that in the first embodiment, but the form of the void in the second embodiment is different from that in the first embodiment. Therefore, in the present embodiment, the form of the void will be described using FIG. 8, and the description of the other components will be omitted.

Figure 8:
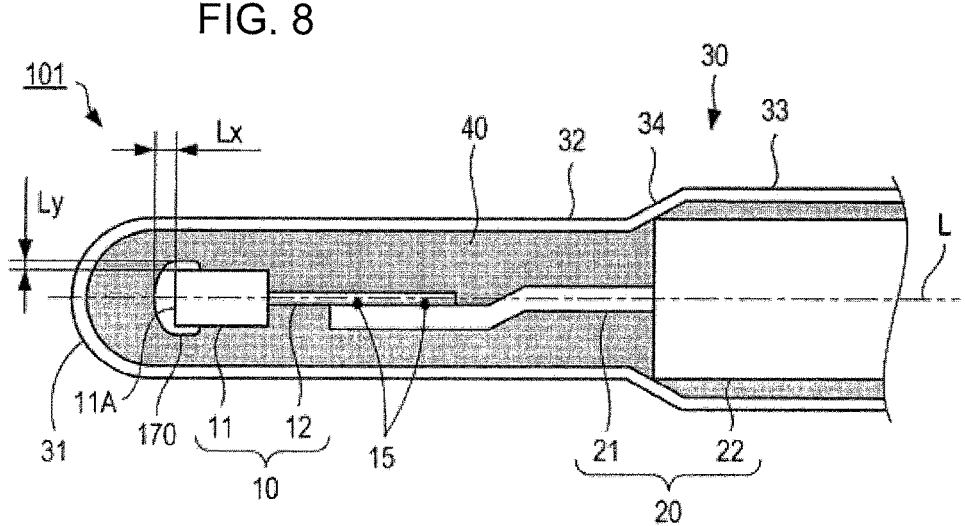
FIG. 8 is a cross-sectional view illustrating the internal structure of the forward end portion of the metal tube of a temperature sensor which is a second embodiment of the present invention.

As shown in FIG. 8, the thermistor element 10 and the cement 40 are disposed inside the metal tube 30 of the temperature sensor 101 in the present embodiment. The cement 40 is charged into the metal tube 30 so as to be in contact with the inner wall surface of the tube forward end 31 of the metal tube 30. In other words, the cement 40 is charged such that at least the cement 40 is placed between the inner wall surface of the tube forward end 31 and a void 170 described later. A side surface of the temperature sensitive portion 11 that is located between its forward end facing the tube forward end 31 and the rear end to which the electrode wires 12 are connected corresponds to an example of the "side circumferential portion" in the present invention. The cement 40 is charged so as to be in contact with at least part of the above side surface corresponding to the example of the "side circumferential portion" in the present invention.

The void 170 is formed in the cement 40 and located on the forward end side (the left side in FIG. 8) of the temperature sensitive portion 11. In other words, the void 170 is formed so as to be in contact with the cement 40 and the temperature sensitive portion 11 and not to be in contact with the inner wall surface of the tube forward end 31. The void 170 is disposed so as to extend from the forward end surface 11A of the temperature sensitive portion 11 to its side surface. The distance Lx from the temperature sensitive portion 11 to the forward end boundary of the void 170 and the distance Ly from the temperature sensitive portion 11 to the side boundary of the void 170 satisfy the relation Lx>Ly.

One example of a method of forming the void 170 is as follows. First, a temperature sensitive portion 11 having a forward end coated with a sublimable material is prepared. The coating is formed by a method in which the forward end of the temperature sensitive portion 11 is immersed in a solution of the sublimable material or a method in which the sublimable material is sprayed onto the forward end of the temperature sensitive portion 11. Then the prepared temperature sensitive portion 11 is inserted into the cement 40 charged into the metal tube 30. Alternatively, the prepared temperature sensitive portion 11 is disposed inside the metal tube 30, and then the cement 40 is charged into the metal tube 30. Finally, in the process of solidifying the cement 40 by firing, the sublimable material is sublimated. The void 170 is formed as a space from which the sublimable material has been removed.

After the temperature sensitive portion 11 and the cement 40 are disposed inside the metal tube 30 but before the cement 40 is solidified, centrifugation degassing treatment may be performed. In the centrifugation degassing treatment, the metal tube 30 is held such that the tube forward end 31 is located radially outward, and then the metal tube 30 is rotated. Centrifugal force directed toward the tube forward end 31 thereby acts on the cement 40, so that the density of the cement 40 at the tube forward end 31 increases. In other words, the density of the cement 40 in the periphery of the temperature sensitive portion 11 increases, so that the thermal conductivity in the periphery becomes high. In addition, the temperature sensitive portion 11 is held more firmly.

The void 170 may be formed using the sublimable material as described above or may be formed using the sublimable material and performing the centrifugation degassing treatment. Alternatively, reverse centrifugation degassing treatment described later may be used to form the void 170. In the reverse centrifugation degassing treatment, after the temperature sensitive portion 11 and the cement 40 are disposed inside the metal tube 30, the metal tube 30 is held such that the tube forward end 31 is positioned toward the center of rotation, and then the metal tube 30 is rotated. Centrifugal force directed in a direction away from the tube forward end 31 thereby acts on the cement 40. The cement 40 is thereby separated from the tube forward end 31, whereby a space is formed near the tube forward end 31. Finally, in the process of solidifying the cement 40 by firing, the cement 40 is solidified, and the above-formed space serves as the void 170.

In the temperature sensor 101 configured as described above, the tube forward end 31 is in direct contact with the cement 40. A heat conduction path extending from the tube forward end 31 to the temperature sensitive portion 11 through the cement 40 is formed, so that the response speed of the temperature sensor can be improved. In addition, the void 170 can provide a space on the forward end side of the temperature sensitive portion 11. Therefore, a space large enough to absorb the shrinkage of the cement 40 in the axial direction L can be ensured, and stress due to the shrinkage can be absorbed.

The technical scope of the present invention is not limited to those of the above embodiments, and the embodiments may be modified in various ways without departing from the spirit of the invention. For example, the present invention is not limited to be applied to the above embodiments and may be applied to an appropriate combination of the above embodiments, and no particular limitation is imposed on the application of the invention.

The invention claimed is:
1. A temperature sensor comprising:
a temperature sensitive element including a temperature sensitive body and an element electrode wire;
a sheath portion that includes a sheath conductor connected to the element electrode wire;
a tubular surrounding portion having a bottom portion at a forward end thereof and extending in an axial direction and having an inner space that accommodates at least the temperature sensitive element and a junction portion between the element electrode wire and the sheath conductor; and
a holding member that is located in the inner space and is in contact with at least part of a side circumferential portion of the temperature sensitive body and at least part of the junction portion, the side circumferential portion being located between a forward end of the temperature sensitive body and a rear end thereof;
wherein a void is provided forward of the forward end of the temperature sensitive body within the surrounding portion, and
wherein, when the void is projected in the axial direction from a forward end side of the surrounding portion, a projection of the void contains at least a forward end surface of the temperature sensitive body.

2. The temperature sensor according to claim 1, wherein, when the void is projected in the axial direction from the forward end side of the surrounding portion, the projection of the void contains at least a forward facing surface of the temperature sensitive body.

3. The temperature sensor according to claim 2 wherein
the void is disposed so as to extend from the forward facing surface of the temperature sensitive body to the side circumferential portion, and
a distance from the temperature sensitive element to a forward end boundary of the void is larger than a distance from the temperature sensitive element to a side boundary of the void.

4. The temperature sensor according to claim 2, wherein the holding member is in contact with an inner wall surface of the bottom portion of the surrounding portion.

5. The temperature sensor according to claim 4 wherein
the void is disposed so as to extend from the forward facing surface of the temperature sensitive body to the side circumferential portion, and
a distance from the temperature sensitive element to a forward end boundary of the void is larger than a distance from the temperature sensitive element to a side boundary of the void.

6. The temperature sensor according to claim 2, wherein
the bottom portion has a curved shape, and
the void has a continuous form extending from the bottom portion to a boundary between a circular cylindrical surface of the surrounding portion and the bottom portion.

7. The temperature sensor according to claim 2, wherein
the bottom portion has a curved shape, and
the void has a continuous form extending from the bottom portion to the forward end of the temperature sensitive body.

8. The temperature sensor according to claim 1, wherein the holding member is in contact with an inner wall surface of the bottom portion of the surrounding portion.

9. The temperature sensor according to claim 1, wherein
the bottom portion has a curved shape, and
the void has a continuous form extending from the bottom portion to a boundary between a circular cylindrical surface of the surrounding portion and the bottom portion.

10. The temperature sensor according to claim 1, wherein
the bottom portion has a curved shape, and
the void has a continuous form extending from the bottom portion to the forward end of the temperature sensitive body.

11. The temperature sensor according to claim 1, wherein the void provides a space large enough to absorb a shrinkage of the holding member in the axial direction.

12. The temperature sensor according to claim 1, wherein, when the void is projected in the axial direction from the forward end side of the surrounding portion, the projection of the void overlaps with the temperature sensitive body.

* * * * *